United States Patent
King et al.

(10) Patent No.: US 11,478,005 B2
(45) Date of Patent: Oct. 25, 2022

(54) FOAM CONTROL

(71) Applicant: DOW GLOBAL TECHNOLOGIES LLC, Midland, MI (US)

(72) Inventors: Stephen W. King, Lake Jackson, TX (US); Clark H. Cummins, Midland, MI (US); Michael L. Tulchinsky, Midland, MI (US); Xue Chen, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 16/636,231

(22) PCT Filed: Mar. 14, 2019

(86) PCT No.: PCT/US2019/022172
§ 371 (c)(1),
(2) Date: Feb. 3, 2020

(87) PCT Pub. No.: WO2019/178306
PCT Pub. Date: Sep. 19, 2019

(65) Prior Publication Data
US 2021/0000153 A1 Jan. 7, 2021

Related U.S. Application Data

(60) Provisional application No. 62/644,024, filed on Mar. 16, 2018, provisional application No. 62/644,038, filed on Mar. 16, 2018.

(51) Int. Cl.
*A23L 29/00* (2016.01)
*A23L 19/12* (2016.01)

(52) U.S. Cl.
CPC ............ *A23L 29/035* (2016.08); *A23L 19/12* (2016.08)

(58) Field of Classification Search
CPC ............................. A23L 29/035; A23L 19/12
USPC .......................................................... 426/329
See application file for complete search history.

(56) References Cited

U.S. PATENT DOCUMENTS

| | | | |
|---|---|---|---|
| 2,753,309 A | 7/1956 | Figdor | |
| 3,990,905 A * | 11/1976 | Wachala | C13B 10/003 127/44 |
| 5,429,718 A | 7/1995 | Morlino et al. | |
| 2012/0004470 A1 * | 1/2012 | Matsumoto | B01J 27/053 568/618 |

FOREIGN PATENT DOCUMENTS

| | | |
|---|---|---|
| DE | 19702846 | 7/1998 |
| EP | 2402302 | 1/2012 |

OTHER PUBLICATIONS

Aytekin, "Nucleophilic Reactivity of Ethers Against Terminal Epoxides in the Presence of BF 3: A Mechanistic Study" Helvetica Chimica Acta. 2013, p. 1325-1330, vol. 96.
Denkov, "Mechanisms of Foam Destruction by Oil-Based Antifoams" 2004, p. 9463-9509, vol. 22.
PCT/US2019/022172, International Search Report and Written Opinion dated May 20, 2019.

* cited by examiner

*Primary Examiner* — Brent T O'Hern

(57) ABSTRACT

A method for controlling foam comprising providing food composition comprising a foam control agent and a foodstuff, the foam control agent comprising a Mono glycidyl ether adduct or a Diglycidyl ether adduct. A composition useful for foam control comprising a mono glycidyl ether adduct, a diglycidyl ether adduct or combination thereof.

9 Claims, No Drawings

FOAM CONTROL

BACKGROUND

The processes for manufacturing foodstuffs occasionally cause unwanted foam generation. Mechanical methods of foam management have limited effectiveness. Instead, foam control agents are added to the manufacturing process to reduce foam generation. For food and pharma applications, traditional foam control agents include ethylene oxide-based, propylene oxide-based and silicone-based agents. However, these incumbent foam control agents are becoming disfavored in the food industry. Foam-control agents that are biodegradable, and renewably sourced are desired.

SUMMARY

A first aspect of the invention is a method for controlling foam comprising providing a food composition comprising a foam control agent and a foodstuff, the foam control agent comprising at least one of the following mono glycidyl ether adducts or diglycidyl ether adducts:

| Entry | Mono glycidyl ether adduct | Diglycidyl ether adduct |
|---|---|---|
| (1) | | |
| (2) | | |
| (3) | | |
| (4) | | |
| (5) | | |
| (6) | | |

-continued

| Entry | Mono glycidyl ether adduct | Diglycidyl ether adduct |
|---|---|---|
| (7) | | |
| (8) | | |
| (9) | | |
| (10) | | |
| (11) | | |
| (12) | | |
| (13) | | |

-continued

| Entry | Mono glycidyl ether adduct | Diglycidyl ether adduct |
|---|---|---|
| (14) | | |
| (15) | | |
| (16) | | |
| (17) | | |
| (18) | | |
| (19) | | |
| (20) | | |

| Entry | Mono glycidyl ether adduct | Diglycidyl ether adduct |
|---|---|---|
| (21) | | |
| (22) | | |
| (23) | | |
| (24) | | | wherein $R^1$ is n-butyl, and wherein $R^2$ is 2-ethylhexyl; and processing the food composition.

A second aspect of the invention is a foam control composition comprised of a mixture of at least one of the mono glycidyl ether adducts and one diglycidyl ether adducts of the first aspect of the invention.

A third aspect of the invention is a method of controlling foam comprising providing a food composition comprising a foam control agent and a foodstuff, the foam control agent comprising a mono glycidyl ether adduct and a diglycidyl ether adduct that are the reaction products of an alcohol having from 1 to 32 carbon atoms and

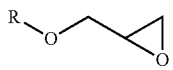

wherein R is either 2-ethylhexyl or n-butyl and processing the food composition. The alcohol may be aliphatic, having a linear, branched, or cyclic structure, as well as aromatic or a mixture of aromatic and aliphatic parts. Preferably, the alcohol has from 4 to 24 or 18 carbons. Preferably the alcohol is aliphatic. More preferably, the alcohol is a linear or branched aliphatic alcohol. Most preferably, the alcohol is a linear aliphatic alcohol.

DETAILED DESCRIPTION

The present disclosure describes methods and compositions for controlling foam. The methods and compositions described herein are particularly relevant to food processing applications. During food-processing foam can be generated at various points in the production process. The foam is caused by the presence of surface-active substances such as proteins, fatty acids and sugars when aeration (generated for example by mechanical agitation, mixing, washing, extraction, stirring, sparging, etc.) occurs during processing. Foam impairs the food processing process in many different ways and greatly disrupts the process flow. The methods and compositions described herein are effective in limiting the amount of foam generated in a food processing application as compared to a similar food process where the methods described herein are not used. Without being limited by theory, it is expected that the methods and compositions of the present disclosure have features that both (1) limit the amount of foam generated in a food process (also known as anti-foam agents) and (2) minimize or eliminate generated foams (also known as defoaming agents). The food composition and the foam control agent are combined as is known in the art, for example, by mixing.

The foam control agent may be prepared according to a process illustrated by Equation (1):

wherein R is either 2-ethylhexyl or n-butyl.

The reaction product of Equation (1) provides a mixture of ether products; the primary product is a mono glycidyl ether adduct and the secondary product is a diglycidyl ether adduct. The amount of each adduct, however may range widely with the primary product generally being present in amount of at least 50% by weight and preferably at an amount of at least 75% by weight. Desirably, the mixture is used as formed without any purification. Trace or small amounts of higher ethers are also likely present in the reaction product. The compositions described herein may be a mixture of ethers prepared according to the process illustrated by Equation (1), and may be used without subsequent separation steps to isolate one or more of the ether products from the product mixture. Likewise, the products may be separated by any suitable separation methods such as those known in the art and the mono glycidyl ether adduct or the diglycidyl ether adduct may be used individually or mixed in any desirable ratio. In addition, any mono glycidyl ether adduct and diglycidyl ether adduct arising from the process may be combined into a mixture and used as the foam control agent.

Equation 1, as indicated above, is merely an illustration of one process set of conditions that may be used to form the ether adducts with other readily determinable conditions being applicable. For example, the temperature may be any suitable temperature such as from 50° C. to 150° C. The time may be any suitable time such as from several minutes to 72 hours, but practically is desirably as short a time as possible to make a useful products such as less than 24 hours to 1 hour. The catalyst may be any suitable catalyst such as an alkali metal containing catalyst. Illustratively, the catalyst may be potassium hydride, sodium hydride, potassium hydroxide, sodium hydroxide or mixture thereof. Preferably the catalyst is an alkali hydride such as potassium hydride.

Table 1 lists 24 Entries, one row per Entry. In each entry, the Starting Alcohol, Mono glycidyl ether adduct, and Diglycidyl ether adduct are listed for the reaction shown in Equation (1). In Table 1 $R^1$ refers to n-butyl and $R^2$ refers to 2-ethylhexyl.

TABLE 1

| Entry | Starting Alcohol | Mono glycidyl ether adduct | Diglycidyl ether adduct |
|---|---|---|---|
| (1) | | | |
| (2) | | | |
| (3) | | | |
| (4) | | | |
| (5) | | | |
| (6) | | | |

TABLE 1-continued

| Entry | Starting Alcohol | Mono glycidyl ether adduct | Diglycidyl ether adduct |
|---|---|---|---|
| (7) | | | |
| (8) | | | |
| (9) | | | |
| (10) | | | |
| (11) | | | |
| (12) | | | |
| (13) | | | |
| (14) | | | |
| (15) | | | |

TABLE 1-continued

| Entry | Starting Alcohol | Mono glycidyl ether adduct | Diglycidyl ether adduct |
|---|---|---|---|
| (16) | | | |
| (17) | | | |
| (18) | | | |
| (19) | | | |
| (20) | | | |
| (21) | | | |
| (22) | | | |
| (23) | | | |
| (24) | | | |

The foam control agent optionally further includes a solvent, a surfactant, an emulsifier, or a combination thereof. The foam control agent contains from 0.5 to 100 percent, by weight, of the mixture of the Mono glycidyl ether adduct and the Diglycidyl ether adduct of any one of Entries (1) through (24). Alternatively, the foam control agent contains from 5 to 100 percent, by weight, of the mixture of the Mono glycidyl ether adduct and the Diglycidyl ether adduct of any one of Entries (1) through (24). Alternatively, the foam control agent contains from 10 to 100 percent, by weight, of the mixture of the Mono glycidyl ether adduct and the Diglycidyl ether adduct of any one of Entries (1) through (24). Alternatively, the foam control agent contains from 15 to 100 percent, by weight, of the mixture of the Mono glycidyl ether adduct and the Diglycidyl ether adduct of any one of Entries (1) through (24). Alternatively, the foam control agent contains from 20 to 100 percent, by weight, of the mixture of the Mono glycidyl ether adduct and the Diglycidyl ether adduct of any one of Entries (1) through (24). Alternatively, the foam control agent contains from 25 to 100 percent, by weight, of the mixture of the Mono glycidyl ether adduct and the Diglycidyl ether adduct of any one of Entries (1) through (24). Alternatively, the foam control agent contains from 30 to 100 percent, by weight, of the mixture of the Mono glycidyl ether adduct and the Diglycidyl ether adduct of any one of Entries (1) through (24).

The optional solvent contained in the foam control agent is selected to be suitable for dissolving or dispersing the mixture of the Mono glycidyl ether adduct and the Diglycidyl ether adduct of any one of Entries (1) through (24). Such solvents include hydrocarbons (both aromatic and aliphatic), and oxygenated solvents (alcohols, ketones, aldehydes, ethers, glycol ethers, esters, and glycol ether esters).

The optional surfactant or emulsifier contained in the foam control agent is selected to be suitable for improving the wettability of the foam control agent on the foodstuff, or forming an emulsion with the mixture of the Mono glycidyl ether adduct and the Diglycidyl ether adduct of any one of Entries (1) through (24). The optional surfactant or emulsifier has an amount ranging from 0.1-30% by weight of the mixture of the Mono glycidyl ether adduct and the Diglycidyl ether adduct of any one of Entries (1) through (24).

The optional surfactant or emulsifier may be anionic, cationic or nonioic. Examples of suitable anionic surfactants or emulsifiers are alkali metal, ammonium and amine soaps; the fatty acid part of such soaps contains preferably at least 16 carbon atoms. The soaps can also be formed "in situ;" in other words, a fatty acid can be added to the oil phase and an alkaline material to the aqueous phase.

Other examples of suitable anionic surfactants or emulsifiers are alkali metal salts of alkyl-aryl sulfonic acids, sodium dialkyl sulfosuccinate, sulfated or sulfonated oils, e.g., sulfated castor oil; sulfonated tallow, and alkali salts of long-chain chain petroleum alkyl sulfonic acids.

Suitable cationic surfactants or emulsifiers are salts of long chain primary, secondary or tertiary amines, such as oleylamide acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable nonionic surfactants or emulsifiers are alkoxylation products of higher fatty alcohols with ethylene oxide, such as the reaction product of oleyl alcohol with 10 ethylene oxide units; alkoxylation products of alkylphenols with ethylene oxide, such as the reaction product of iso-octylphenol with 12 ethylene oxide units; alkoxylation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethyleneglycol monobehenate, tricosaethyleneglycol dibehenate, polyhydric alcohol partial higher fatty acid esters such as sorbitan tristearate, ethylene oxide addition products of polyhydric alcohol partial higher fatty acid esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10-15 molecules of ethylene oxide, mannitan monopalmitate reacted with 10-15 molecules of ethylene oxide; long chain polyglycols in which one hydroxyl group is esterified with a higher fatty acid and other hydroxyl group is etherified with a low molecular alcohol, such as methoxypolyethylene glycol 550 monostearate (550 meaning the average molecular weight of the polyglycol ether). A combination of two or more of these surfactants may be used; e.g., a cationic may be blended with a nonionic or an anionic with a nonionic.

The foam control agent may further comprise one or more additive. Examples of additives include ethylene oxide/propylene oxide block copolymers, butylene oxide/propylene oxide block copolymers, ethylene oxide/butylene oxide block copolymers, waxes, or silicone-based materials.

The "food composition" described herein is a combination of the foam control agent and the foodstuff. As used herein, a "foodstuff" refers to material that is edible or drinkable, or a material that can be processed into an edible or drinkable material. A foodstuff generally is used to refer to any material that is used in combination with the foam control agent to make the food composition. Preferably, the foodstuff is a potato, potato derivative, beet or beet derivative. As used herein, derivative means that the foodstuff has been processed to some extent. Examples of such processes include, washing, slicing, fermenting, grating, crushing, peeling, and mixing. The beet or beet derivative is preferably a sugar beet or derivative thereof. The foodstuff may be pre-processed according to one or more processing steps prior to addition of the foam control agent. Alternatively, the foodstuff may be washed between processing steps, whereby a foam control agent is added separately during one or more of the processing steps.

The foam control agent is added to the foodstuff in sufficient quantity to achieve the level of foam control necessary for the process. It is recognized that different food processing techniques result in varying levels of foam generation, and as such, require varying amounts of foam control agent to achieve the desired result. The amount of foam control agent added to the food stuff is measured as a percentage of the combined weight of the foam control agent and the foodstuff (total weight of the food composition), where the quantity of the foam control agent is from 0.01 to 5 percent, by weight, of the total weight of the food composition, preferably, 0.1 to 1 percent, by weight, of the total weight of the food composition.

Examples 24 reactions were carried out under nitrogen in individual small reactors. Each reactor contained a glass insert along with a removable polyether ether ketone (PEEK) stir bar. Each reactor was dried in a vacuum oven at 125° C. Table 2 lists the 24 reactions, including the Starting Alcohol that was charged to the reactor and the Mono glycidyl ether adduct and the Diglycidyl ether adduct that were produced by the reaction. As used in Table 2, $R^1$ is n-butyl and $R^2$ is 2-ethylhexyl. 10 mmol of the Starter Alcohol for one Entry of Table 2 was added to a respective glass insert by pipette under nitrogen. The amounts of alcohols ranged from 0.359 to 2.237 ml. Potassium hydride (1 mmol, 40 mg) was introduced into each vial and the mixtures were stirred until the gas bubbling stopped. Then 2-ethylhexyl glycidyl ether (10 mmol, 1.86 g) was added to each glass insert having a Product having an $R^2$ moiety or n-butyl glycidyl ether (10 mmol, 0.91 g) was added to each glass insert having a Product having an $R^1$ moiety. The temperature was increased to 100° C. and reaction mixtures were stirred for 20 hours after reaching the process temperature. Then the reactors were cooled, the samples were analyzed by GC-MS, and the products were identified (Table 2).

TABLE 2

| Entry | Starting Alcohol | Mono glycidyl ether adduct | Diglycidyl ether adduct |
|---|---|---|---|
| (1) | | | |
| (2) | | | |
| (3) | | | |
| (4) | | | |
| (5) | | | |
| (6) | | | |
| (7) | | | |
| (8) | | | |

TABLE 2-continued

| Entry | Starting Alcohol | Mono glycidyl ether adduct | Diglycidyl ether adduct |
|---|---|---|---|
| (9) | 1-octanol | mono glycidyl ether of 1-octanol | diglycidyl ether of 1-octanol |
| (10) | benzyl alcohol | mono glycidyl ether of benzyl alcohol | diglycidyl ether of benzyl alcohol |
| (11) | 4-methyl-2-pentanol | mono glycidyl ether of 4-methyl-2-pentanol | diglycidyl ether of 4-methyl-2-pentanol |
| (12) | 2-ethylhexanol (longer chain) | mono glycidyl ether | diglycidyl ether |
| (13) | 1,3-propanediol | mono glycidyl ether | diglycidyl ether |
| (14) | 1,3-propanediol | mono glycidyl ether | diglycidyl ether |
| (15) | 1-heptanol | mono glycidyl ether | diglycidyl ether |
| (16) | 2-heptanol | mono glycidyl ether | diglycidyl ether |
| (17) | 2-ethyl-1-butanol | mono glycidyl ether | diglycidyl ether |

TABLE 2-continued

| Entry | Starting Alcohol | Mono glycidyl ether adduct | Diglycidyl ether adduct |
|---|---|---|---|
| (18) | HO-CH2-C6H5 | $R^1$-O-CH2-CH(OH)-CH2-O-CH2-C6H5 | $R^1$-O-CH2-CH(O-CH2-CH(OH)-CH2-O-$R^1$)-CH2-O-CH2-C6H5 |
| (19) | (CH3)2CH-CH(OH)- | $R^2$-O-CH2-CH(OH)-CH2-O-CH(CH3)-CH(CH3)2 | $R^1$-O-CH2-CH(O-CH2-CH(OH)-CH2-O-$R^1$)-CH2-O-CH(CH3)-CH(CH3)2 |
| (20) | cyclohexanol | $R^1$-O-CH2-CH(OH)-CH2-O-cyclohexyl | $R^1$-O-CH2-CH(O-CH2-CH(OH)-CH2-O-$R^1$)-CH2-O-cyclohexyl |
| (21) | isopropanol | $R^2$-O-CH2-CH(OH)-CH2-O-iPr | iPr-O-CH2-CH(O-CH2-CH(OH)-CH2-O-$R^2$)-CH2-O-$R^2$ |
| (22) | n-propanol | $R^2$-O-CH2-CH(OH)-CH2-O-nPr | nPr-O-CH2-CH(O-CH2-CH(OH)-CH2-O-$R^2$)-CH2-O-$R^2$ |
| (23) | isobutanol | $R^2$-O-CH2-CH(OH)-CH2-O-iBu | iBu-O-CH2-CH(O-CH2-CH(OH)-CH2-O-$R^2$)-CH2-O-$R^2$ |
| (24) | cyclohexanol | $R^2$-O-CH2-CH(OH)-CH2-O-cyclohexyl | cyclohexyl-O-CH2-CH(O-CH2-CH(OH)-CH2-O-$R^2$)-CH2-O-$R^2$ |

Potatoes were washed in water, peeled and sliced. 780 g of sliced potatoes and 520 g of deionized (DI) water were added to a kitchen food processor and processed for 1 minute. A potato slurry was generated, which was filtered through filter paper and the liquid was used to evaluate the foam control agents. This liquid is referred to as potato liquor.

For the evaluation of these materials as foam control agents a sample was prepared for each of the 24 Products (mono glycidyl ether adduct and diglycidyl ether adduct product mixture) listed in Table 2. Each sample contained 0.5 g of the corresponding product in Table 2 and 99.5 g of potato liquor to give 100 g of material for evaluation. In addition, a control sample was also prepared which contained 100 g of potato liquor without any glycidyl ether adduct.

A sparge tube test was utilized to evaluate the performance of the foam control agents. The description of this testing procedure is known in the literature and is incorporated here by reference: N. D. Denkov, "Mechanisms of Foam Destruction by Oil-Based Antifoams," *Langmuir* 2004, 20 (22), 9463-9505. The "foam control efficiency" of a material was evaluated by measuring its effect on the foam height. 100 g of each liquid sample described above was added separately into a 1000 mL glass cylinder with a diameter of 5 cm. A vertical gas sparging tube fitted with a sintered glass frit was placed at the cylinder bottom and air was bubbled from the bottom of the cylinder. Air flow was controlled by an Ametek Lo-Flo 0-10 Float Meter with the setting at 1. Foam heights were recorded during the first 10 minutes after air flow was applied. If a foam height reached 1000 mL within the first 10 minutes, the experiment was stopped.

Table 3 are foam volumes of potato liquor as a function of time, for the Examples, and Control sample. In the Table, the Examples 1-24 correspond to the products listed in Table 2 which have been added to the potato liquor as listed above and the control is a potato liquor without any glycidyl ether adduct added. The unit of numerical value of foam volume is mL. As shown in the table, the addition of products from Table 2 resulted in foam levels which stayed below 1000 mL even after 10 minutes, while the foam volume of the control reached 1000 mL within 2 minutes.

TABLE 3

Foam volume (mL) increase as a function of time for potato liquor

| Example | 1 min | 2 min | 3 min | 4 min | 5 min | 6 min | 7 min | 8 min | 9 min | 10 min |
|---|---|---|---|---|---|---|---|---|---|---|
| Control | 600 | >1000 | >1000 | >1000 | >1000 | >1000 | >1000 | >1000 | >1000 | >1000 |
| 1 | 310 | 470 | 560 | 560 | 560 | 570 | 600 | 600 | 590 | 600 |
| 2 | 210 | 440 | 510 | 570 | 590 | 600 | 620 | 640 | 640 | 640 |
| 3 | 250 | 380 | 390 | 390 | 420 | 420 | 420 | 420 | 410 | 420 |
| 4 | 210 | 360 | 420 | 420 | 420 | 440 | 450 | 450 | 450 | 450 |
| 5 | 255 | 395 | 425 | 425 | 435 | 445 | 445 | 455 | 465 | 455 |
| 6 | 255 | 525 | 695 | 745 | 765 | 795 | 765 | 765 | 765 | 765 |
| 7 | 260 | 360 | 390 | 390 | 410 | 410 | 410 | 410 | 410 | 410 |
| 8 | 270 | 510 | 530 | 560 | 600 | 620 | 620 | 670 | 690 | 690 |
| 9 | 320 | 480 | 520 | 520 | 520 | 520 | 520 | 520 | 500 | 500 |
| 10 | 230 | 470 | 530 | 600 | 660 | 680 | 700 | 760 | 760 | 760 |
| 11 | 250 | 400 | 410 | 430 | 440 | 440 | 450 | 470 | 480 | 480 |
| 12 | 230 | 450 | 620 | 660 | 680 | 690 | 680 | 690 | 690 | 690 |
| 13 | 230 | 430 | 480 | 490 | 490 | 500 | 500 | 500 | 500 | 500 |
| 14 | 250 | 360 | 400 | 400 | 420 | 420 | 440 | 450 | 450 | 450 |
| 15 | 340 | 410 | 510 | 550 | 590 | 630 | 640 | 690 | 690 | 690 |
| 16 | 280 | 380 | 460 | 470 | 490 | 520 | 540 | 590 | 620 | 640 |
| 17 | 310 | 570 | 620 | 650 | 690 | 740 | 740 | 760 | 790 | 790 |
| 18 | 270 | 550 | 600 | 630 | 630 | 630 | 630 | 630 | 630 | 630 |
| 19 | 310 | 460 | 500 | 510 | 520 | 520 | 570 | 570 | 570 | 570 |
| 20 | 310 | 470 | 530 | 530 | 530 | 530 | 530 | 530 | 530 | 530 |
| 21 | 230 | 400 | 420 | 470 | 480 | 500 | 510 | 520 | 540 | 540 |
| 22 | 230 | 470 | 500 | 540 | 570 | 590 | 590 | 590 | 590 | 590 |
| 23 | 270 | 470 | 550 | 600 | 620 | 630 | 640 | 660 | 660 | 660 |
| 24 | 240 | 450 | 500 | 520 | 540 | 550 | 560 | 560 | 560 | 560 |

Sugar beets were washed and processed in a like manner as the potatoes described above including a control. Table 4 are foam volumes of sugar beet liquor as a function of time, for the Examples, and Control Example. In Table 4, the Examples 15a-24a correspond to the products listed in Table 2 (15-24) which have been added to the sugar beet as listed above and the control is a sugar beet liquor without any glycidyl ether adduct added. The unit of numerical value of foam volume is mL. As shown in the table, the addition of products from Table 2 resulted in foam levels which stayed below 1000 mL even after 10 minutes, while the foam volume of the control reached 1000 mL within 2 minutes.

TABLE 4

Foam volume (mL) increase as a function of time for sugar beet liquor

| Example | 1 min | 2 min | 3 min | 4 min | 5 min | 6 min | 7 min | 8 min | 9 min | 10 min |
|---|---|---|---|---|---|---|---|---|---|---|
| Control | 600 | >1000 | >1000 | >1000 | >1000 | >1000 | >1000 | >1000 | >1000 | >1000 |
| 15a | 0 | 0 | 0 | 10 | 10 | 10 | 10 | 10 | 10 | 10 |
| 16a | 10 | 10 | 10 | 10 | 10 | 10 | 10 | 10 | 10 | 10 |
| 17a | 50 | 50 | 100 | 100 | 100 | 100 | 100 | 100 | 100 | 100 |
| 18a | 20 | 20 | 30 | 30 | 30 | 20 | 20 | 20 | 20 | 20 |
| 19a | 0 | 0 | 0 | 10 | 10 | 10 | 10 | 10 | 10 | 10 |
| 20a | 10 | 10 | 10 | 10 | 10 | 10 | 10 | 10 | 10 | 10 |
| 21a | 30 | 30 | 40 | 50 | 50 | 50 | 50 | 50 | 50 | 50 |
| 22a | 30 | 30 | 40 | 60 | 50 | 30 | 30 | 30 | 30 | 30 |
| 23a | 30 | 30 | 30 | 30 | 30 | 30 | 30 | 30 | 30 | 30 |
| 24a | 270 | 320 | 350 | 330 | 260 | 230 | 170 | 170 | 170 | 170 |

What is claimed is:
1. A method for controlling foam comprising:
providing food composition comprising a foam control agent and a foodstuff, the foam control agent comprising at least one of the following: mono glycidyl ether adducts or diglycidyl ether adducts

| Entry | Mono glycidyl ether adduct | Diglycidyl ether adduct |
| --- | --- | --- |
| (1) | ![structure] | ![structure] |
| (2) | ![structure] | ![structure] |
| (3) | ![structure] | ![structure] |
| (4) | ![structure] | ![structure] |
| (5) | ![structure] | ![structure] |
| (6) | ![structure] | ![structure] |
| (7) | ![structure] | ![structure] |

-continued

| Entry | Mono glycidyl ether adduct | Diglycidyl ether adduct |
|---|---|---|
| (8) | | |
| (9) | | |
| (10) | | |
| (11) | | |
| (12) | | |
| (13) | | |
| (14) | | |

-continued
| Entry | Mono glycidyl ether adduct | Diglycidyl ether adduct |
|---|---|---|
| (15) | 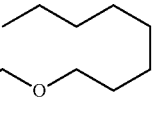 | 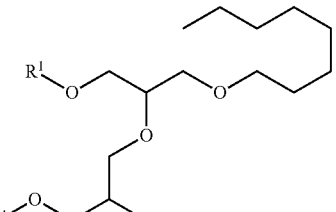 |
| (16) | 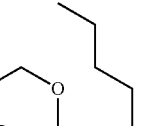 | 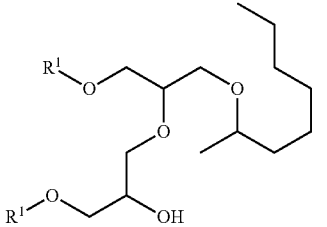 |
| (17) | 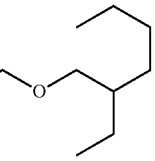 | 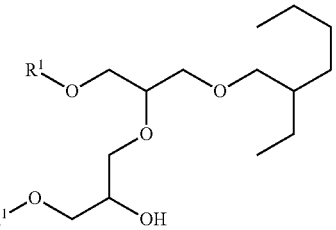 |
| (18) | 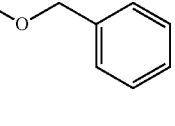 | 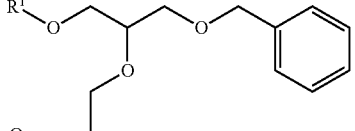 |
| (19) | 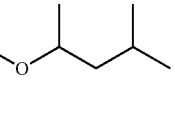 | 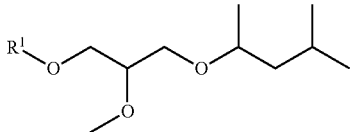 |
| (20) | 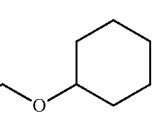 | 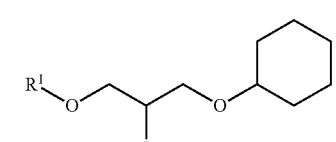 |
| (21) | 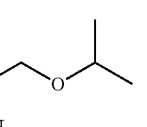 | 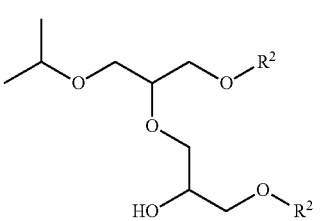 |

| Entry | Mono glycidyl ether adduct | Diglycidyl ether adduct |
|---|---|---|
| (22) | | |
| (23) | | |
| (24) | | | wherein $R^1$ is n-butyl, and $R^2$ is 2-ethylhexyl; and processing the food composition.

2. The method of claim 1 wherein the foam control agent is comprised of a mixture of one of the mono glycidyl ether adducts and one of the diglycidyl ether adducts.

3. The method of claim 2, wherein the foam control agent contains 30 to 100 percent, by weight, of the mixture of the mono glycidyl ether adduct and the diglycidyl ether adduct, wherein the mixture is any one of Entries (1) through (24).

4. The method of claim 1, wherein the quantity of the foam control agent in the food composition is 0.01 to 5 percent, by weight.

5. The method of claim 1, wherein the quantity of the foam control agent in the food composition is 0.1 to 1 percent, by weight.

6. The method of claim 1, wherein the foam control agent further comprises a solvent.

7. The method of claim 1, wherein the foam control agent further comprises a surfactant or an emulsifier.

8. The method of claim 1, wherein the step of processing the food comprises one or more of washing, slicing, fermenting, grating, crushing, peeling, or mixing.

9. The method of claim 1, wherein the foodstuff comprises a potato derivative.

* * * * *